United States Patent [19]

Carr et al.

[11] Patent Number: 5,029,231
[45] Date of Patent: Jul. 2, 1991

[54] RADIANT HEAT PANEL

[75] Inventors: Owen R. Carr; Donald W. McAdam, both of Vancouver, Canada

[73] Assignee: The University of British Columbia, Canada

[21] Appl. No.: 461,827

[22] Filed: Jan. 8, 1990

[51] Int. Cl.$^5$ .................. H05B 3/20; F24H 9/00; F24D 19/02

[52] U.S. Cl. .................. 392/435; 392/434; 392/436; 392/437; 338/290; 338/317; 338/318; 219/542

[58] Field of Search ............. 219/213, 342, 345, 542, 219/544; 338/253, 285, 290, 293, 306, 317–318, 321; 392/435–437, 439, 434

[56] References Cited

U.S. PATENT DOCUMENTS

| | | | |
|---|---|---|---|
| 829,808 | 8/1906 | Shipp | 219/345 |
| 1,891,595 | 12/1932 | Grierson | 392/437 |
| 2,138,217 | 11/1938 | Sutter | 219/542 |
| 3,119,918 | 1/1964 | Simon | 219/345 |
| 3,603,764 | 9/1971 | Martin | 219/345 |
| 3,751,630 | 8/1973 | Brasky | 219/345 |
| 3,961,157 | 6/1976 | Miller et al. | 219/345 |
| 4,203,198 | 4/1980 | Hackett et al. | 29/611 |
| 4,878,332 | 11/1989 | Drake | 219/213 |

FOREIGN PATENT DOCUMENTS

| | | | |
|---|---|---|---|
| 20742 | 12/1934 | Australia | 219/213 |
| 1361165 | 6/1963 | France | 219/213 |
| 864656 | 4/1961 | United Kingdom | 219/213 |

Primary Examiner—Bruce A. Reynolds
Assistant Examiner—John A. Jeffery
Attorney, Agent, or Firm—C. A. Rowley

[57] ABSTRACT

A radiant heating panel is formed using a foam insulation core surrounded by a reinforcing mesh and having a pair of wiring harness fixtures snapped over each end of the reinforced core. A radiant heating wire is strung back and fourth between the fixtures to provide a radiant heating element and the core structure, including the radiant heating element, is then wrapped in a paper wrapper which is secured to the core through the reinforcing layer on the side of the core opposite the heating element. A cementicious thermal insulating layer is applied to encase the heating element and the paper wrapper is wrapped into overlying relationship with the cementicious layer to substantially completely enclose the core.

9 Claims, 2 Drawing Sheets

RADIANT HEAT PANEL

FIELD OF THE INVENTION

The present invention relates to a radiant heating panel. More particularly the present invention relates to a lightweight radiant heating panel having significant thermal resistance.

BACKGROUND OF THE PRESENT INVENTION

The concept of applying a heating element in a panel has been known for many, many years. A variety of different panels have been proposed and a variety of different techniques for incorporating the radiant heating elements into the panels have been used.

One of the more common systems utilizes a gypsum board into which grooves are cut and the radiant heating wires are embedded in the grooves to define a radiant heating panel. One such panel is shown in U.S. Pat. No. 3,751,630 issued Aug. 7 1973 to Brasky.

In another system a plastic laminate incorporating a film type radiant heating element has been secured either to the face of a panel or between a pair of adjacent panels. The encased element functions not only as a heating element but also defines a vapour barrier see for example U.S. Pat. No. 4,203,198 issued May 20 1980 to Hacket.

The effectiveness of the insulating overlying a radiant heating panel which is normally applied on the ceiling of a building is reduced significantly if the temperature on the side of the insulation adjacent the ceiling (the radiant heating panel) is high as the thermal efficiency of, for example, fiberglass is significantly dependent on the temperature gradiant there across.

BRIEF DESCRIPTION OF THE PRESENT INVENTION

It is an object of the present invention to provide an insulated radiant heating panel that is lightweight and easy to install.

Broadly, the present invention relates to a radiant heating panel comprising a foam insulation core, a first u-shaped wiring harness fixture extending around one end of said core and a second u-shaped wiring harness fixture extending a second end of said core, said second end being opposite said first end, heating element wire guide means on each of said wiring fixtures, an electrical resistance heating wire strung back and forth between said fixtures and positioned by said guide means, said electrical wire in a position spaced from one surface of said core.

Preferably said heating element guiding means will comprise ridges extending substantially transverse to said surface of said core and to the direction in which said electrical wire is strung back and forth between said fixtures, grooves formed in said ridges, said electrical wire being received in and positioned by said grooves.

Preferably a reinforcing web will wrap said core and be received within said first and said second fixtures.

Preferably two layers of said reinforcing web will be provided between said electrical heating wire strung back and forth between said fixtures and said one surface of said foam core.

Preferably a cementicious thermal insulating layer will be formed on said one surface of said core and will encase said electrical wire heating element, said cementicious insulating layer having a depth greater than the spacing between said electrical heating wire and said core.

Preferably said core together with said electrical heating wire and said cementicious encasing layer will be received within a paper wrapper, said paper wrapper extending around a second pair of opposed sides of said core with the overlying said cementicious layer.

Preferably the thickness of said cementicious layer will correspond with the height of said ridges on said fixtures above said surface of said core.

Preferably said edges of said wrapper will leave exposed a portion of the surface of said cementicious layer substantially parallel to said surface of said core and a label ply will interconnect said edges to complete the wrapping of said panel.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
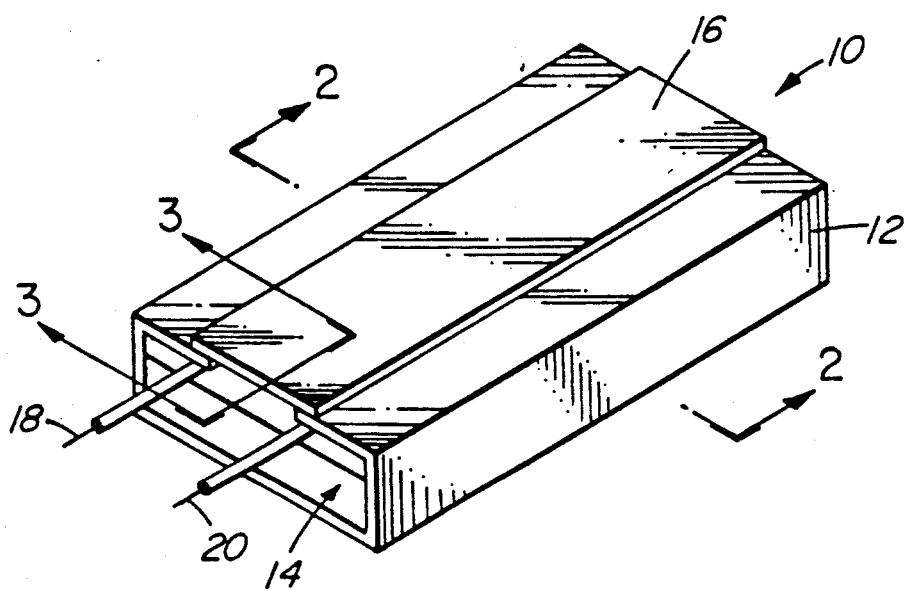
FIG. 1 is an isometric illustration of a radiant heating panel constructed in accordance with the present invention showing the heating panel in inverted position (assuming it is to be used on the ceiling).

The radiant heating panel 10 shown in FIG. 1 includes an outside paper wrapper 12 wrapping an inner core 14 with the edges of the wrapper being interconnected by a label ply 16 to completely encircle the core 14. A pair of electrical leads 18 and 20 provide electrical connections to the heating element as will be described below.

Figure 4:
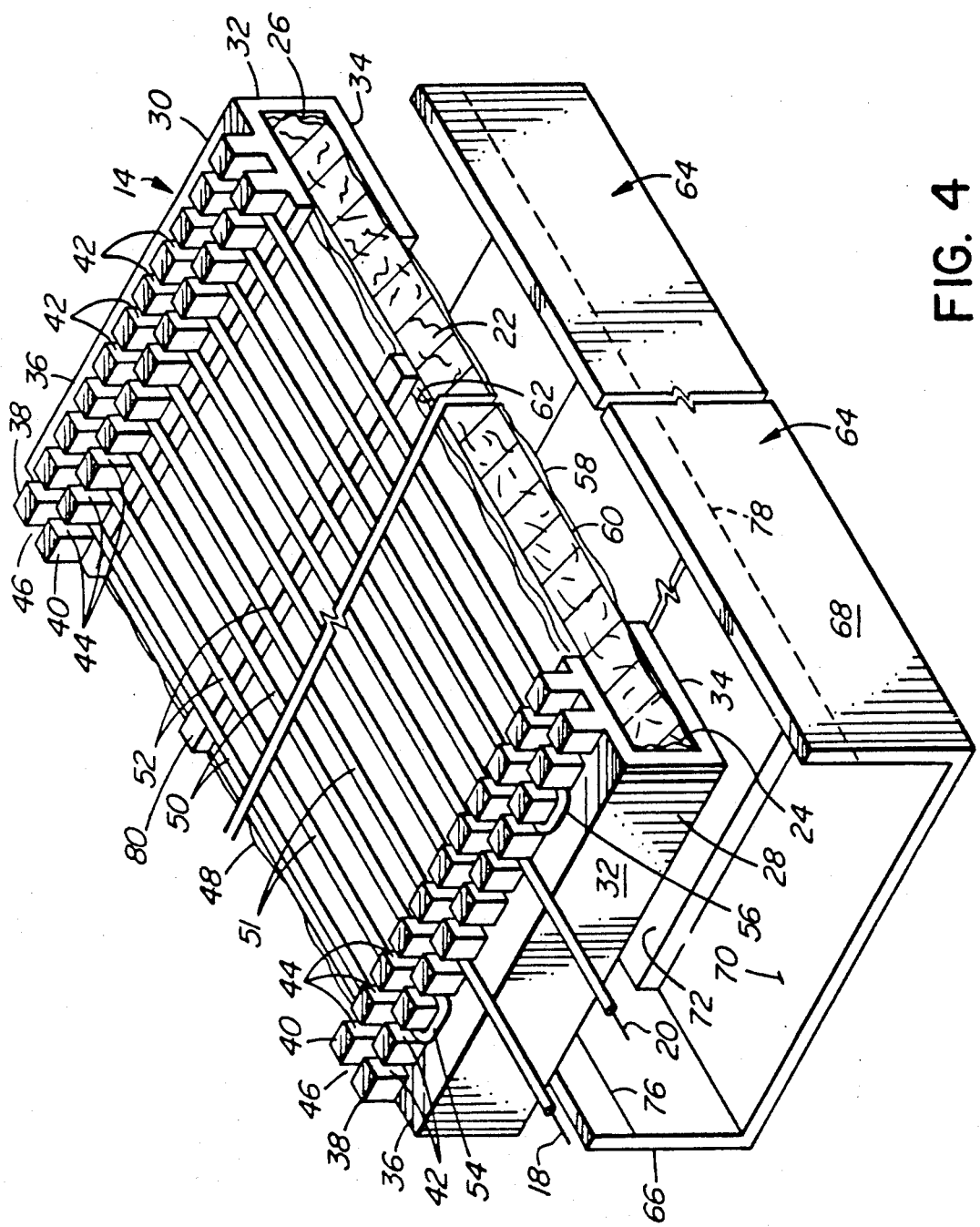
FIG. 4 is an enlarged exploded view showing some of the main components of the present invention and how they are assembled into the radiant heating panel.

Referring to FIG. 4, the core 14 is formed by a foam insulation core 22, the axial ends 24 and 26 of which are encircled by wiring harness fixtures 28 and 30 respectively which are substantially identical in the illustrated arrangement. Each of the wiring harness fixtures 28 and 30 is an extruded substantially u-shaped section having a bridging portion 32 interconnecting a pair of substantially parallel legs 34 and 38 (like elements have been indicated with like reference numerals on the two fixtures 28 and 30).

The ends 24 and 26 are received between the legs 34 and 36 of their respective fixtures 28 and 30 and the ends 24 and 26 substantially abut against the inner surface of the bridging sections 32.

Two ridges 38 and 40 have been formed on each of the fixtures 28 and 30. These ridges are formed with transverse grooves some of which are indicated at 42 and 44 respectively.

A transverse passage 46 is provided or formed between the ridges 38 and 40.

The heating element 48 is composed of a wire 50 which is passed back and forth between the two fixtures 28 and 30 with the spacing between adjacent wires such as the wires 51 and 52 being determined by the spacing between the grooves 44 in the ridges 40.

To wire the panel, wire 50 from the lead 18 is brought through one of the grooves 42 in the ridge 38 then taken out, in this case through an adjacent slot 42 to form a loop 54 around a portion of the ridge 38 and then back into the groove 46 and across the groove or passage 46 to pass out through the slot 44 in the ridge 40 and located adjacent one side of the panel. The wire 50 is then extended along the length of the foam core 22 and through the slot 44 in the ridge 40 along the passage 46 to the next groove 44 in the fixture 30 and then back to the fixture 28 along the groove 46 in the fixture 28 to the next slot 44 and then back along the length of the core 22 to the fixture 30 and so on back and forth until the desired numbered strings of wire 51,52, are formed. Then the wire is pulled through a grove 42 in the ridge 48 to form a second loop such as the loop 56 and is returned to the passage 46 and then back out through an adjacent groove 42 to form the lead 20.

It will be noted that the ridge 38 and its grooves 42 in the fixture 30 are not really used other than to define th opposite face of the passage 46 thus if desired one of the ridges 38 or 40 could be dispensed with on one of the fixtures such as the fixture 30.

It is preferred to wrap foam core 22 in a reinforcing mesh, i.e. a scrim or leno wave open mesh material 58 that extends longitudinally of the core in taut relationship with the upper side 60 of the core 22 and around the ends 24 and 26 within the fixtures 28 and 30 so that the fixtures 28 and 30 clamp the reinforcing material 58 to the core 22. This reinforcing material extends across the bottom surface 62 of the core of the fixtures 28 and 30 substantially full way across the thermal insulating foam core 22, i.e. longitudinally of the core to the opposite fixture 28 or 30 so that two layers of reinforcing web 58 are provided on the bottom surface 62 interposed between the wire 50 of the heating element 48 and the surface 62 of the core.

This reinforcing mesh 58 which may be made of any suitable material tends to resist bowing of the core 22 to resist warpage of the core 22 as the wire 50 forming the heating element 48 is strung back and forth between the fixtures 28 and 30, i.e. the wire 50 of the heating element 48 is under tension and the reinforcing mesh 58 resists bowing of the core 22 as the heating element wire 50 is strung back and forth and after the heating element has been completed.

When the heating element 48 has been strung so that the core 14 is substantially as illustrated in FIG. 4 the core 14 is positioned within a wrapper 64 which is preferably made of paper having suitable characteristics. The paper wrapper 64 is folded into a substantially u-shaped configuration as illustrated wherein the side legs 66 and 68 are interconnected by a bridging section 70. A suitable adhesive mix such as gypsum mortar as indicated at 72 is received within the u-shaped wrapper 64 and then the completed core 14 (with the exception of the cemintious thermal insulation layer to be described below) is lowered (FIG. 4) into the u-shaped wrapper 64 so that the adhesive layer 72 embeds the reinforcing layer 58 and secures the core 14 and fixtures 28 and 30 to the bridging section 70 of the wrapper 64.

Figure 2:
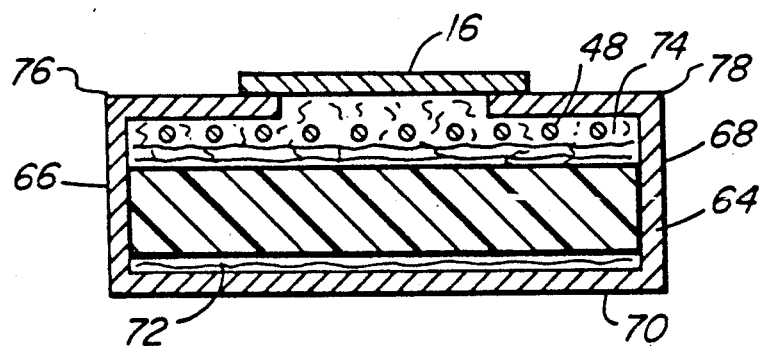
FIG. 2 is a section along the line 2—2 of FIG. 1.
Figure 3:
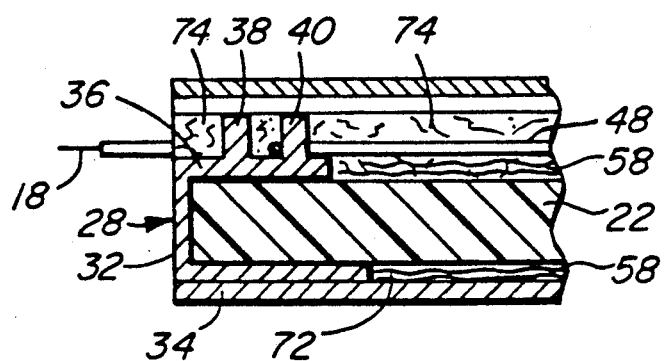
FIG. 3 is a section along the line 3—3 of FIG. 1.

Turning now to FIGS. 2 and 3, a suitable thermal insulating cementicious layer is then poured over the surface 62 to embed the mesh 58 layer(s) interposed between the surface 62 and the wire 50 of the heating element 48 as indicated at 74 in FIGS. 2 and 3. This cementicious layer 74 preferably provides an insulation layer and is formed of a cement composition incorporating materials such as expanded pearlite or the like to provide the insulation feature. No special formulation is necessary however it should be compatible with an adhere to the foam core 22 and encase the wire 50 and the mesh 58.

The thickness of the cementicious insulation layer 74 preferably coincides with the height of the ridges 38 and 40 (see FIG. 3) so that in pouring and forming the layer 74 the required depth can be easily determined and attained in the finished product.

The sides 66 and 68 of the wrapper 64 are then folded over the layer 74 which sets into a solid layer to at least partially encase this layer 74 and the wrapping of the core 14 is completed by a label ply 16 which is secured to the spaced surfaces of the leg 66 and 68, i.e. the legs 66 and 68 are folded for example on fold lines 76 and 78 respectively into overlying relationship with the layer 74 and secured in position by the label ply 16. If no label ply 16 is used the length of the legs 66 and 68 extending from the base 70 may be extended so that they overlap or at least abut when they are folded on the fold lines 76 and 78 over the layer 74.

To install the system the panels shown in FIG. 1 are installed with the label 16 facing in the direction in which the radiant energy is to be projected, i.e. if the panels are positioned on the floor, the label 16 will face upwardly, alternatively if the panels are as preferred fixed on the ceiling the label 16 will face down.

If desired, a suitable bridging member may be provided extending transversely of the core 22 such as the bridging member 80 which overlies the reinforcing layers 58 and spaces the heating element 48 (wire 50) from the surface 62 of the foam core 22.

The spacing of the heating element 48 from the foam core and the interposition of the embedding cementicious insulation layer 74 protects the foam layer 22 from the heat generated by the heating element 48 to ensure that the foam is not significantly damaged by the heat generated from the heating element 48.

Having described the invention, modifications will be evident to those skilled in the art without departing from the spirit of the invention as defined in the appended claims.

We claim:

1. A radiant heating panel comprising a rigid foam insulation core, an open reinforcing web encircling said core in reinforcing relationship and wrapping a pair of opposite ends of said core, a first u-shaped wiring harness fixture extending around one of said pair of opposite ends of said core and clamping said reinforcing web to said core at said one of said pair of opposite ends and a second u-shaped wiring harness fixture extending around the other of said pair of opposite end of said core and clamping said reinforcing web to said core at said other of said pair of opposite ends, heating element wire guide means on each of said wiring fixtures, an electrical resistance heating wire strung back and forth between said fixtures and positioned by said guide means, said positioned spaced from one surface of said core, a cementicious thermal insulating layer formed on said one surface of said core and encasing said electrical wire heating element, said cementicious insulating layer having a depth greater than the spacing between said electrical heating wire and said core.

2. A radiant heating panel as defined in claim 1 wherein said heating element guide means comprise ridges extending substantially transverse to said surface of said core and to the direction in which said electrical wire is strung back and forth between said fixtures, grooves formed in said ridges, said electrical wire being received in and positioned by said grooves.

3. A radiant heating element as defined in claim 2 wherein two layers of said reinforcing web are provided between said electrical heating wire strung back and forth between said fixtures and said one surface of said foam core.

4. A radiant heating panel as defined in claim 1 wherein said core together with said electrical heating wire and said cementicious encasing layer are received within a paper wrapper, said paper wrapper extending around a pair of opposed sides of said core with the edges of said wrapper overlying said cementicious layer.

5. A radiant heating panel as defined in claim 4 wherein the thickness of said cementicious layer corresponds with the height of said ridges on said fixtures above said surface of said core.

6. A radiant heating panel as defined in claim 5 wherein said edges of said wrapper leave exposed a portion of the surface of said cementicious layer substantially parallel to said surface of said core and wherein a label ply interconnects said edges to complete the wrapping of said panel.

7. A radiant heating panel as defined in claim 2 wherein said core together with said electrical heating wire and said cementicious encasing layer are received within a paper wrapper, said paper wrapper extending around a pair of opposed sides of said core with the edges of said wrapper overlying said cementicious layer.

8. A radiant heating panel as defined in claim 2 wherein the thickness of said cementicious layer corresponds with the height of said ridges on said fixtures above said surface of said core.

9. A radiant heating panel as defined in claim 8 wherein said edges of said wrapper leave exposed a portion of the surface of said cementicious layer substantially parallel to said surface of said core and wherein a label ply interconnects said edges to complete the wrapping of said panel.

* * * * *